(12) United States Patent
Günther

(10) Patent No.: US 6,805,549 B2
(45) Date of Patent: Oct. 19, 2004

(54) NOZZLE FOR INJECTION MOULDING TOOL AND NOZZLE ARRANGEMENT

(75) Inventor: Herbert Günther, Allendorf (DE)

(73) Assignee: Gunther Heisskanal Technik GmbH, Frankenberg (DE)

( * ) Notice: Subject to any disclaimer, the term of this patent is extended or adjusted under 35 U.S.C. 154(b) by 24 days.

(21) Appl. No.: 10/182,383

(22) PCT Filed: Jan. 30, 2001

(86) PCT No.: PCT/EP01/00974

§ 371 (c)(1),
(2), (4) Date: Jul. 29, 2002

(87) PCT Pub. No.: WO01/54882

PCT Pub. Date: Aug. 2, 2001

(65) Prior Publication Data

US 2003/0003188 A1 Jan. 2, 2003

(30) Foreign Application Priority Data

Jan. 31, 2000 (DE) .......................................... 100 04 072
Jan. 31, 2000 (DE) .......................................... 100 04 068

(51) Int. Cl.[7] .............................................. B29C 45/22
(52) U.S. Cl. ...................................... 425/549; 425/572
(58) Field of Search ................................... 524/549.572

(56) References Cited

U.S. PATENT DOCUMENTS

| 3,935,972 | A | | 2/1976 | Tsunemoto et al. |
|---|---|---|---|---|
| 4,892,474 | A | | 1/1990 | Gellert |
| 5,002,480 | A | * | 3/1991 | Gellert et al. ................ 425/549 |
| 5,052,100 | A | * | 10/1991 | Trakas ......................... 425/549 |
| 5,324,190 | A | * | 6/1994 | Frei ............................. 425/549 |
| 5,922,367 | A | | 7/1999 | Assalite et al. |
| 6,079,971 | A | * | 6/2000 | Ramond ..................... 425/549 |

FOREIGN PATENT DOCUMENTS

| DE | 4034934 | 5/1992 |
|---|---|---|
| DE | 19723374 | 12/1997 |
| DE | 19941038 | 3/2001 |
| WO | WO 98/42489 | 10/1998 |
| WO | WO 01/17317 | 3/2001 |

\* cited by examiner

Primary Examiner—Tim Heitbrink
(74) Attorney, Agent, or Firm—Clark & Brody

(57) ABSTRACT

A nozzle 10 for an injection mold has a nozzle body 12 which can be mounted on a mold or manifold and in which at least one duct 22 for molten material is provided which opens at a terminal side at, or in, a nozzle tip 26. In order to be able to realize extremely small pitches in two independent directions in space, the nozzle body 12 has at least one substantially plane lateral surface 14, 15 which carries or accommodates in a plane 2D-type joining and/or arrangement a heating and/or cooling device 28, 28' for the molten material. In a special embodiment, the nozzle 10 within in a row of nozzle R are located next to each other in very close relationship, and two opposing lateral surfaces S or the row of nozzles R are provided with heating and/or cooling devices 28, 28', which are adapted to be connected in groups to a heating or cooling circuit via a common external terminal.

37 Claims, 13 Drawing Sheets

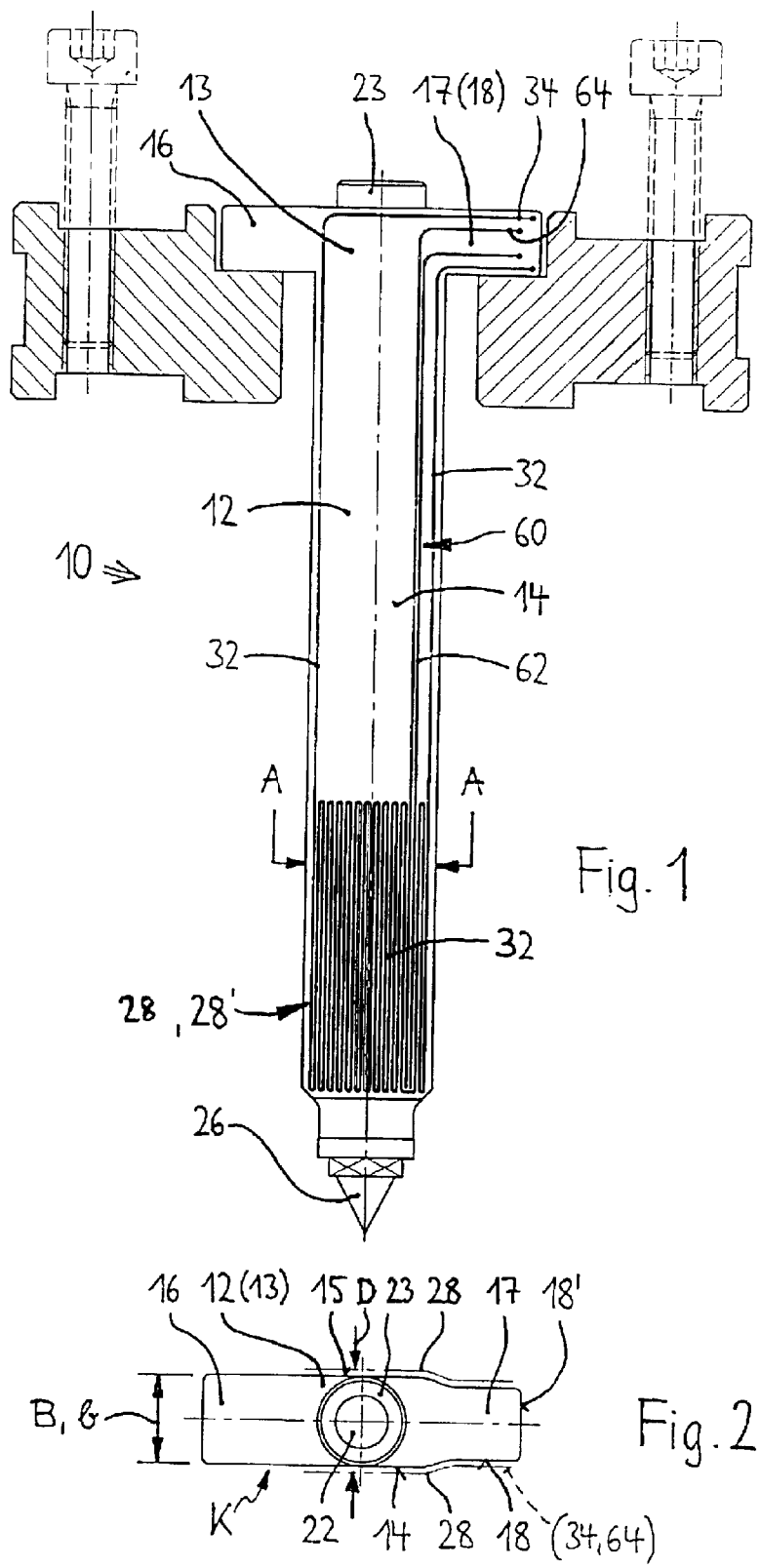

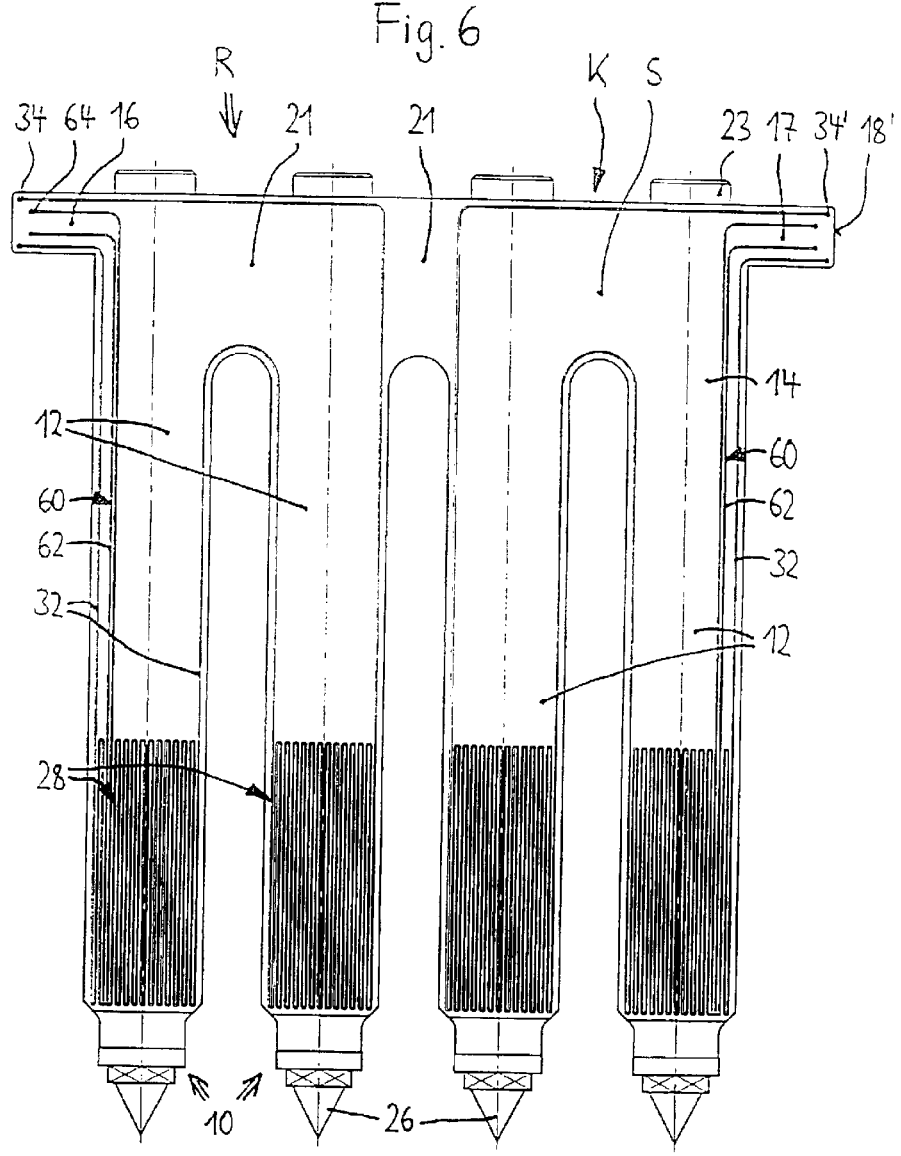
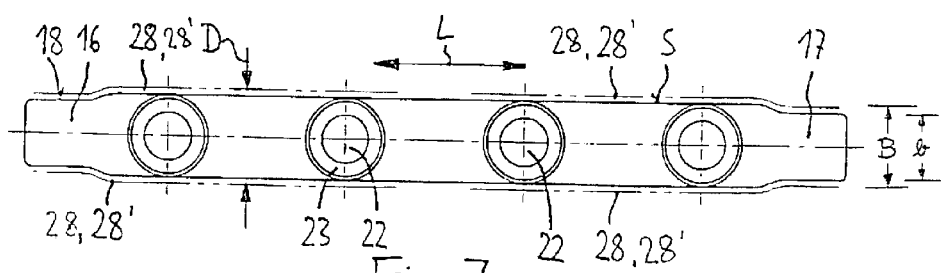

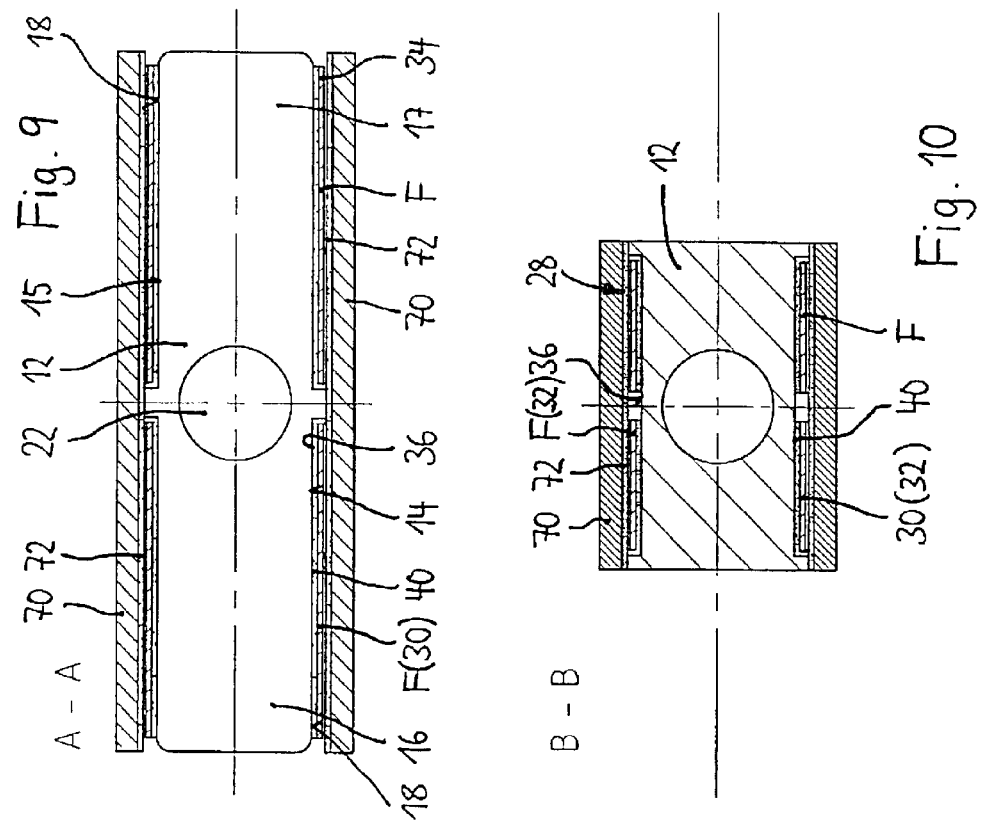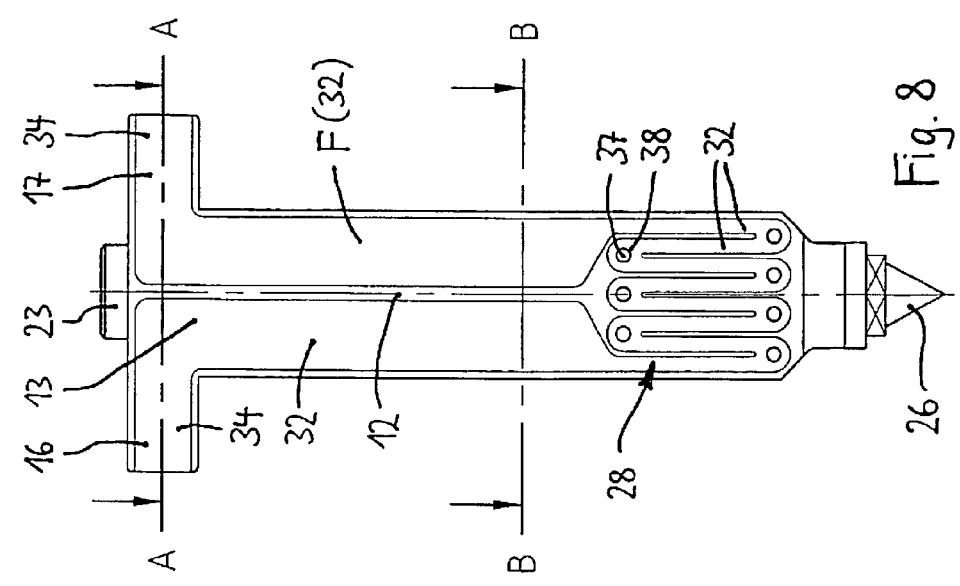

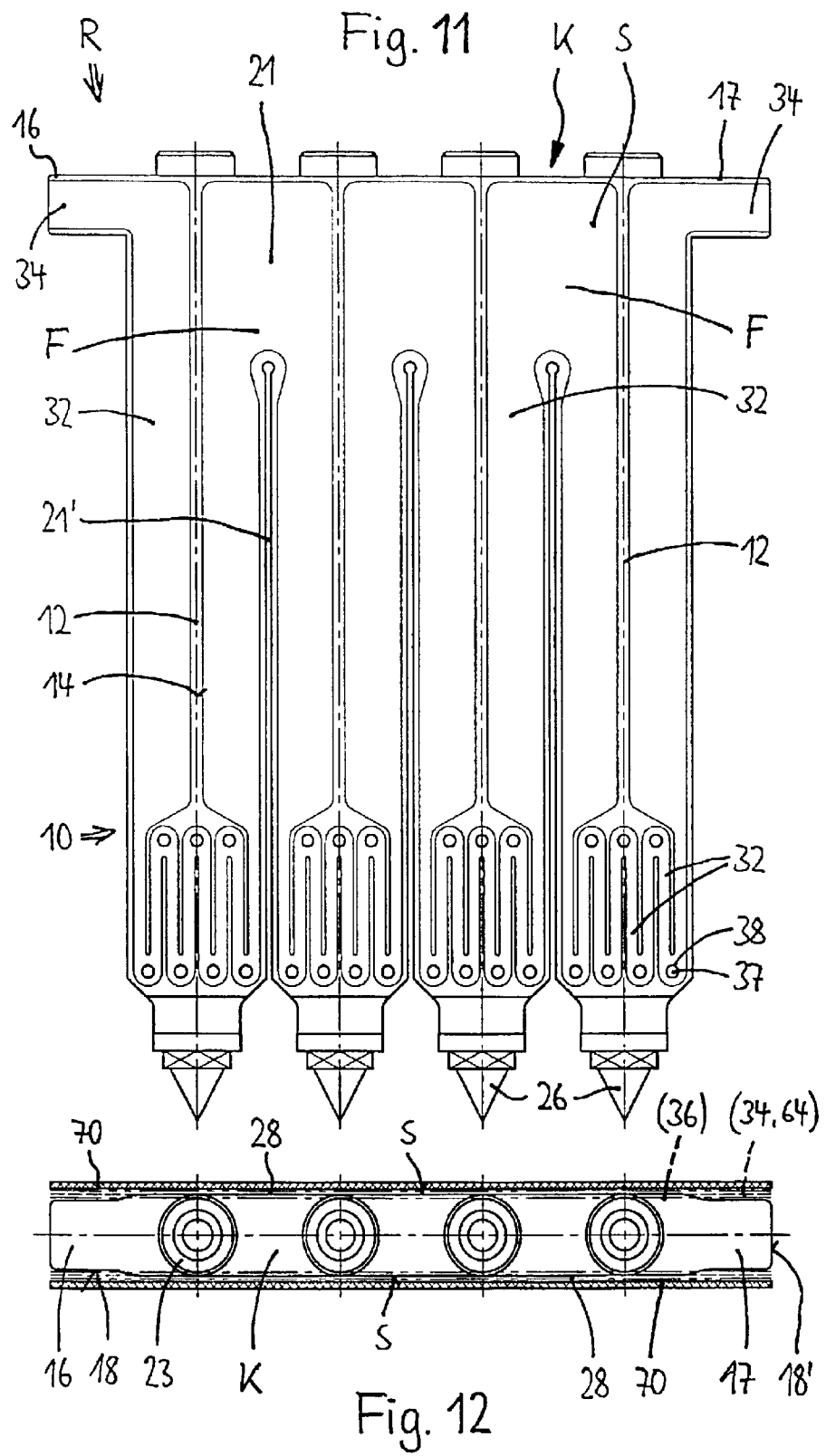

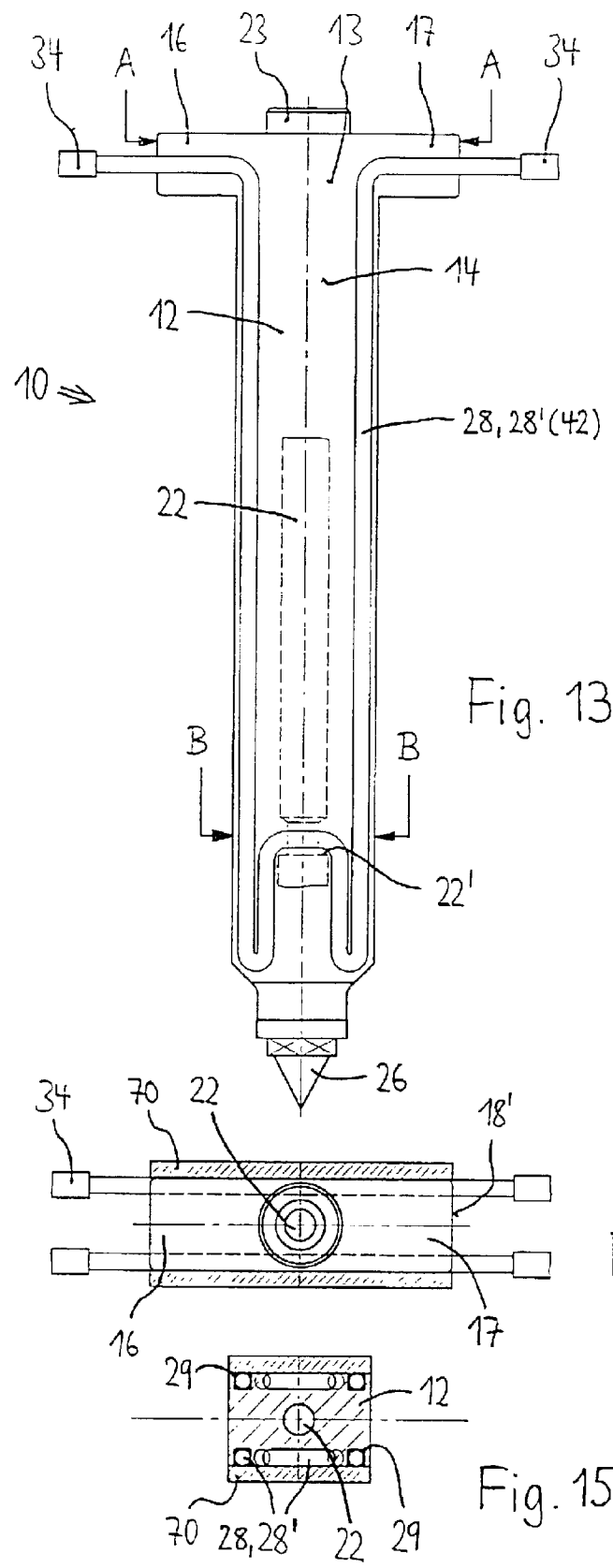

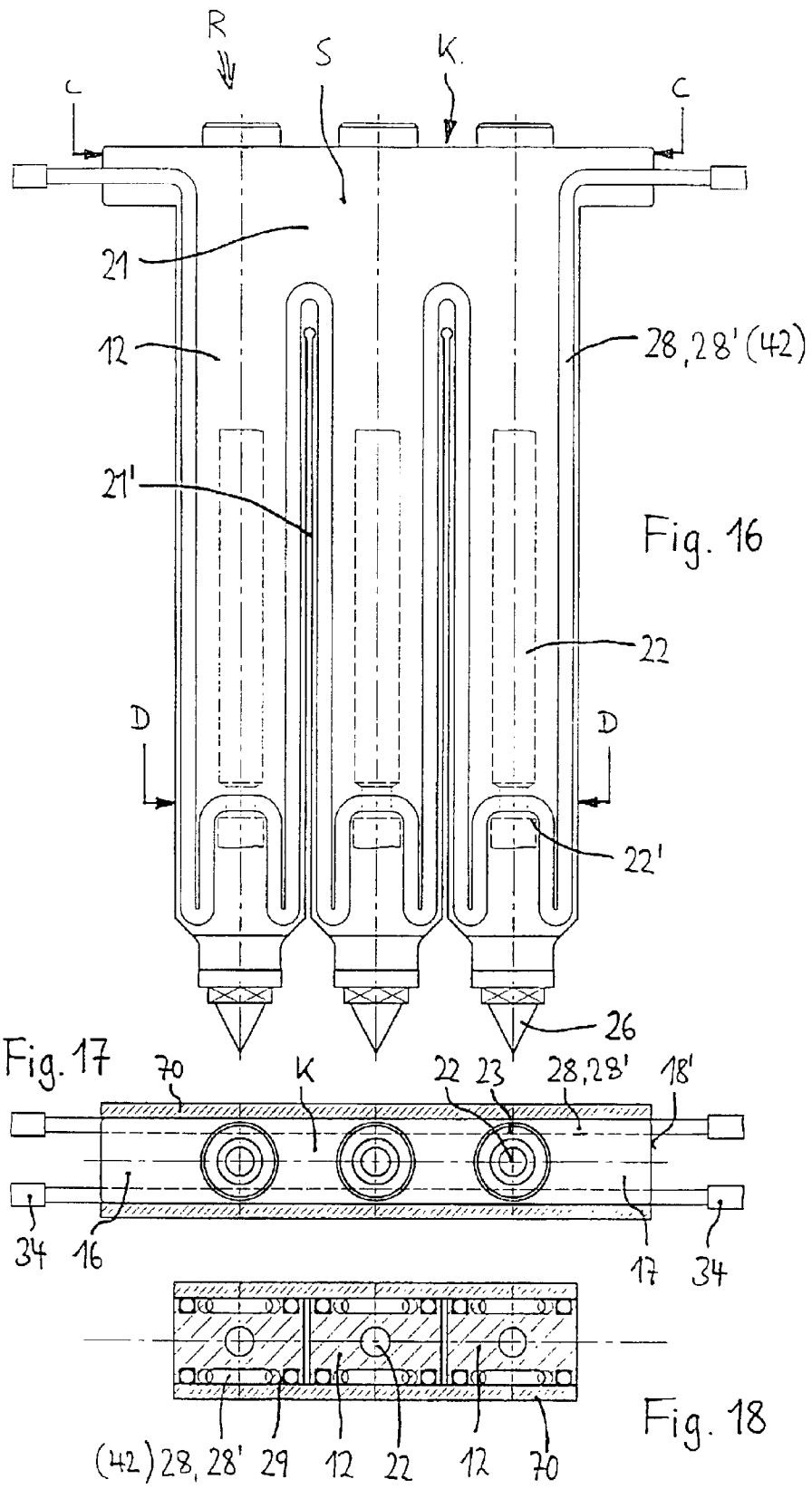

NOZZLE FOR INJECTION MOULDING TOOL AND NOZZLE ARRANGEMENT

The invention relates to a nozzle for injection molds and to a nozzle assembly.

BACKGROUND ART

Nozzles for hot runners or cold runners are generally known. They are used in injection molds for feeding a melt flow at a predefined temperature under high pressure to a separable tool block (mold cavity). For example, in order to prevent a hot plastics flow from premature cooling within the nozzle, electric heating means are provided—as described in DE-U1-295 01 450—which concentrically surround the nozzle body or a duct located therein in order to keep the plastics melt at the desired temperature. However, if for example reactive polymers are processed, it is necessary to cool the nozzle body for ensuring that the mass to be processed will not exceed a specific temperature as it enters the mold cavity. A thermosensor is normally used to probe the temperature.

In the case of hot runner nozzles, the nozzle body and the heating element are usually separate component parts, the heating element being integrated with the thermosensor in a jacket to be pushed onto the nozzle body periphery. As disclosed in DE-U1-89 15 318, DE-U1-295 07 848 or U.S. Pat. No. 4,558,210, the surrounding element may be a rigid unit fixed onto the nozzle body in an axial direction by holding or clamping means. Alternatively, flexible heating strips or mats are used which are attached to the perimeter of the nozzle body (see e.g. EP-B-0 028 153 or WO 97/03540).

SUMMARY OF THE INVENTION

An essential drawback of these generally detachable heating devices is their usually inefficient heat transfer from the heating element to the nozzle body. Now in order to protect the heating means from overheating, it is necessary to increase their dimensions whereby the overall assembly size and thus the space required in the mold will also increase. Furthermore, there are problems with the linear temperature distribution in the duct walls. Rarely will these have a constant temperature over the entire length of the duct. By reason of the increased heat dissipation at the tip of the nozzle, an adequate power density and thus constant temperature at this point can only be achieved with relatively high expenditures.

In numerous fields of applications, it will irrespectively thereof be necessary to inject into separate cavities in order to manufacture a number of articles simultaneously or more complex components. To this end, nozzles for hot runners or cold runners are mounted at defined distances parallel to each other in a manifold or manifold block. However, due to the concentric arrangement of the heating or cooling means on the nozzles and to the fact that their electric terminals usually project laterally from the nozzle casings, the nozzles cannot be positioned closely to each other, which will be problematic where cavity spacings are small or gating points are directly adjacent.

For remedy, it was attempted to attain reduced cavity spacings by positioning the nozzle duct and the heating means laterally, e.g. in a hot runner nozzle as described in DE-U1-296 10 268. However, this reduces the width of the nozzle in a preferred direction only, irrespective of the width of the heating means which still is rather voluminous. Another drawback is the fact that heat will dissipate to only one side of the flow melt, thus possibly causing unbalanced temperature distributions in the duct. Adaptation and control of the power input required is only possible within limits since the power density of the heating means, often a heater cartridge, can be tuned to only one particular application at a time. Pluralities of plug connectors and elaborate cable lines not only require additional space but also extra fitting work, in particular where the terminals of the heating means used are in the interior of the nozzle assembly.

It is an object of the present invention to overcome these and other drawbacks of the prior art and to provide a nozzle for an injection mold permitting uniform heat transfer and temperature distribution characteristics within the nozzle body and requiring little space when mounted to a mold. In an economical manner, a structure is to be obtained which can be manufactured and installed with a minimum of expenditures and which ensures long-term operational reliability.

Another important object of the invention is to provide a nozzle assembly containing an arbitrary number of closely packed hot runner nozzles or cold runner nozzles, which assembly is suited to be cheaply produced with simple means and to be quickly installed. Furthermore, the nozzle interior is to provide uniform heat transfer and temperature distribution characteristics.

In a nozzle for an injection mold comprising a nozzle body adapted to be mounted onto a mold or manifold, the nozzle body having at least one duct for a melt flow which duct opens at or in a nozzle tip, and comprising a heating and/or cooling means for the melt flow, the invention provides that the nozzle body has at least one substantially plane lateral face which supports or accommodates said heating and/or cooling means in a full-faced engaging and/or joining arrangement.

This integral connection between the heating or cooling means and said lateral face in the hot runner nozzle guarantees constant optimal heat transfer from the heating unit to the nozzle body, which will be heated extremely uniformly and precisely. Due to the full surface engagement or joining of the heating means with the plane or slightly curved lateral surface of the nozzle body, the hot runner nozzle has extremely small overall dimensions compared with conventional designs, whilst exhibiting almost identical performance. The same applies to a cooling means integrated with the nozzle body, which cooling means is according to a preferred embodiment directly enclosed in the nozzle body and is flush therewith. Heat transfer from the hot medium to the cooling means is always optimal.

Since the heat is generated and dissipated directly at the lateral surface of the nozzle body to be heated, the power density of such a heating unit can be raised considerably and overheating of the usually sensitive heating elements is reliably avoided. Furthermore, there is no need for elaborate control means to regulate delays caused by thermal inertia of the flow melt. The plastics composition in the flow duct is rapidly and precisely heated, which has a favorable effect on the overall production process. Particularly uniform heating or cooling is achieved where two opposing lateral faces are provided with at least one heating and/or cooling means.

Another substantial advantage of the invention consists in that the hot runner or cold runner nozzle has extremely small dimensions due to the heating or cooling means being located directly against or in the nozzle body. This applies particularly if the heating means positioned at the plane and/or at least partially curved lateral surfaces of the nozzle body is designed as a thin lamina heating unit.

According to another embodiment of the invention, temperature sensing is carried out preferably in the same plane where heating or cooling is effected so that no additional space is required. Heating or cooling means and the thermosensor can be provided on the nozzle body in like manner and in a single manufacturing operation whereby production is simplified considerably.

In a nozzle assembly for injection molds comprising at least two nozzles, each having a nozzle body capable of being mounted on a mold or manifold, the nozzle body including at least one melt flow duct that opens at or in a nozzle tip, and comprising a heating and/or cooling means for the melt flow, the invention provides that the nozzles form a nozzle row within which they are disposed closely and parallel to each other, said nozzle row having at least one substantially plane lateral surface for full-faced engagement or joining to said heating and/or cooling means.

Owing to this extremely compact and space-saving design, the tips of the individual nozzles are very closely packed. Such a row of nozzles allows effortless injection into a number of mold cavities or simultaneously into several gating points, the cavity spacings or the distances between the gating points reaching extremely small values of down to 5 mm in any direction. A comb-like arrangement of the nozzles within the row guarantees that the nozzles are at least partially set at distances from each other, whereby different thermal expansions are allowed for. Moreover the flat nozzle body, which as a whole is preferably an integral unit, can be rapidly and conveniently mounted on a manifold in a single operation so that handling is considerably simplified.

Various spaced grids between the hot runner and/or cold runner nozzles can be realized by disposing a plurality of individual nozzles or rows of nozzles side-by-side within a single manifold. The individual nozzles of these flat bodies thus form a battery with extremely small nozzle spacing in both transverse and longitudinal directions. Since each individual nozzle is provided with e.g. flat heating means which are preferably interconnected on the lateral faces of the flat bodies and are provided with a common terminal, the inner nozzles of a battery are also readily supplied with the necessary heating energy; that was not possible with previous solutions. The entire problem of making connections for the heating or cooling units is considerably simplified, which is beneficial not only for the fitting work.

BRIEF DESCRIPTION OF THE DRAWINGS

Further features, details, and advantages of the invention may be gathered from the wording of the claims and from the following description of working examples with reference to the drawings wherein:

FIG. 1 is a side view of a hot runner nozzle,

FIG. 2 is a top view of the hot runner nozzle of FIG. 1,

FIG. 6 is a side view of a row of nozzles, FIG. 7 is a top view of the row of nozzles of FIG. 6, FIG. 8 is a different embodiment of a hot runner nozzle, FIG. 9 is a cross-sectional view taken along A—A in FIG. 8, FIG. 10 is a cross-sectional view taken along B—B in FIG. 8, FIG. 11 is a side view of another embodiment of a row of nozzles, FIG. 12 is a top view of the row of nozzles of FIG. 11, FIG. 13 is a is another embodiment of a hot runner nozzle, FIG. 14 is a cross-sectional view taken along A—A in FIG. 13, FIG. 15 is a cross-sectional view taken along B—B in FIG. 13, FIG. 16 is yet another variant of a row of nozzles, FIG. 17 is a cross-sectional view taken along C—C in FIG. 16, FIG. 18 is a cross-sectional view taken along D—D in FIG. 16.

DESCRIPTION OF THE PREFERRED EMBODIMENTS

Figure 3:
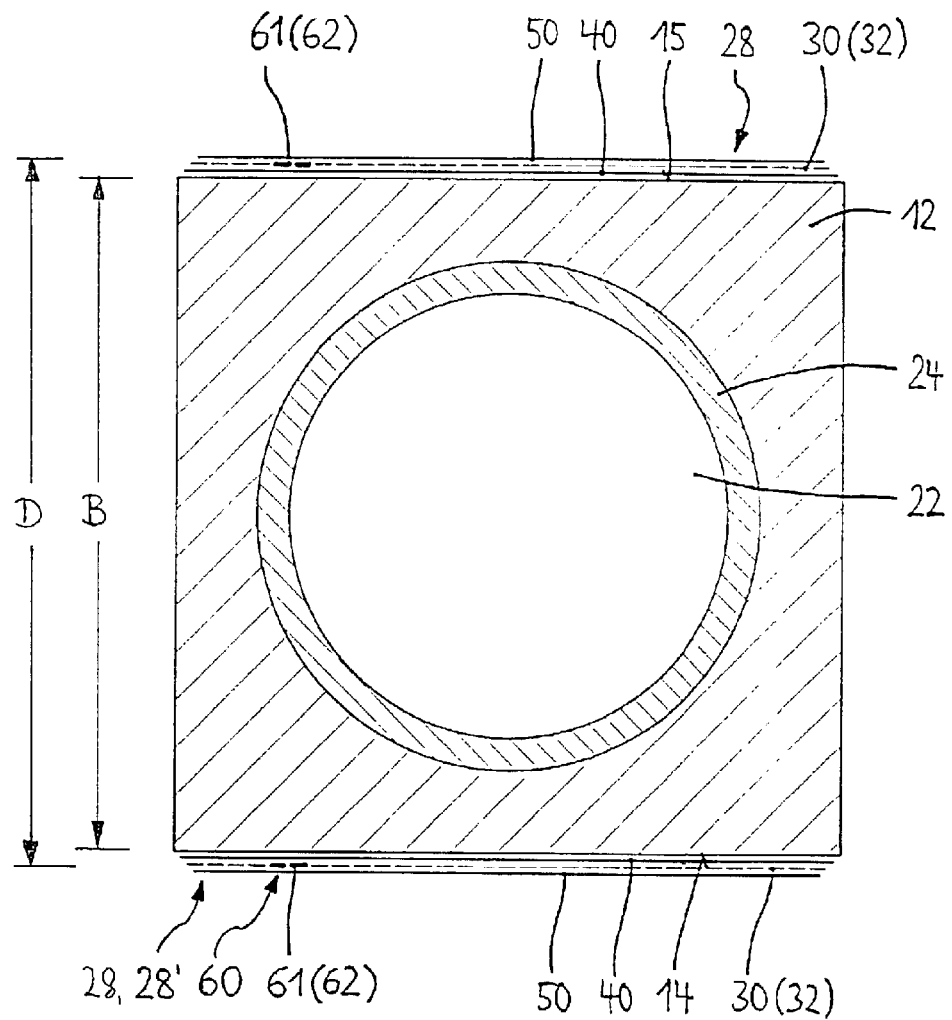
FIG. 3 is an enlarged cross-section through the hot runner taken along A—A in FIG. 1.

A nozzle generally designated by reference numeral 10 in FIG. 1 is a substantially T-shaped hot runner nozzle. It has a cross-sectionally rectangular nozzle body 12 provided at its top end 13 with two lugs 16, 17 forming opposite retainers for fixing to a hot runner mold or manifold (not illustrated). The width b of the lugs 16, 17, which are integral with the nozzle body 12, is equal to latter's width B so that the whole of the hot runner nozzle 10 forms a flat body K (see FIG. 2).

A central duct 22 for melt flow extending in an axial direction is provided within the nozzle body 12. The duct 22, preferably a bore, comprises at its lower end a nozzle tip 26 whereby duct 22 is continued out to a plane (not shown) of a mold cavity (not visible, either). Said nozzle tip 26 is inserted into an end of the nozzle body 12, preferably by a screw joint. However, it may serve the same purpose by way of being an integral part of the nozzle body 12.

To improve coupling and sealing of flow duct 22 in respect of the hot runner manifold, the nozzle body 12 carries between the lugs 16, 17 a ring-shaped centering lug 23 which may be integral with the nozzle body or be part of a flow tube 24. The latter may be of a material other than that of the nozzle body 12 and is positively fitted therein as indicated in FIG. 3. For example, tube 24 may be of a high-strength material whereas the nozzle body 12 is made of a highly thermoconductive material, whereby heat transfer is enhanced. However, it is also possible to manufacture tube 24 and nozzle body 12 as a single steel unit, production thus being simplified accordingly.

Two opposite plane lateral faces 14, 15 of nozzle body 12 serve as bearing faces each for flat heating means 28 that comprise an insulating lamina consisting of a ceramic dielectric layer 40 directly applied to the metal, of a heating layer 30 applied thereon which—as diagrammatically indicated in FIG. 1—includes at least one meandering heating conductor 32, and of an outer cover layer 50 which externally shields and insulates both the heating conductor 32 and the underlying dielectric layer 40.

The heating conductor 32 may be of any desired shape and, depending on the output required, it can be applied to the insulating layer 40 in different configurations and various degrees of close packing. This makes it possible to attain a defined temperature distribution within the nozzle body 12 as desired. Preferably, meandering loops of the heating conductors 32 provided symmetrically on either side of nozzle body 12 concentrate near the region of the nozzle tip 26 so that an adequate temperature can be produced and maintained right up to the mold cavity.

In order to be able to monitor or control the rise and profile of the temperature within the nozzle body 12, at least one of its lateral faces 14, 15 is provided with a thermosensor 60. Like the heating means 28, the thermosensor 60 has a thin monitoring layer 61 disposed in a common plane with the heating layer 30 (FIG. 3). In the thin monitoring layer 61, there is at least one continuous bifilar conducting path 62 which in the lower region of nozzle body 12 extends close to the nozzle tip 26 and, in the upper region of the nozzle body 12, terminates by way of terminal contacts 64 at a lateral surface 18 of, for example, the right-hand lug 17.

On either side there, terminal contacts 34 are located for the heating conductors 32 that run along the sides 14, 15 of nozzle body 12. It will be seen in FIG. 2 that lug 17 recedes relative to the nozzle body 12 toward its end in the region of the terminal contacts 34, 64 so that an electrical plug (not shown) pushed onto lug 17 will not exceed the overall thickness B of the nozzle body 12 and thus the overall thickness of the flat body K. Therefore, the entire hot runner nozzle 10 including the connecting means is extremely slim. Alternatively it may be provided that the terminal contacts 34, 64 for the heating conductors 32 or for the thermosensor 60 engage the end face of lug 17.

The heating layer 30, the insulating layer 40, the cover layer 50, optionally an additional contact layer (not shown) and the monitoring layer 61 are in succession integrally applied to the nozzle body 12 or to its lateral faces 14, 15 by direct coating, whereupon they are baked under firing conditions specific to the particular materials so that a bonded lamina composite is formed whose overall thickness ranges from 0.1 mm to 1.0 mm, preferably between 0.2 mm and 0.6 mm. Each heating lamina composite 28 is undetachably applied as an integral part of the nozzle body 12 in full contact with its lateral faces 14, 15 so that an optimal distribution of power output and heat is achieved with minimum dimensions.

A mechanical compressive pretension in the insulating dielectric layer 40 is produced therein as it is baked, due to specific mismatching between the linear coefficient of thermal expansion of the dielectric layer 40 ($TEC_D$) and the linear coefficient of thermal expansion of the nozzle body 12 ($TEC_K$). Owing to such stress-tolerant joining, the insulating layer 40 which is the supporting layer of the heating means 28 can easily withstand pulsating internal pressure loads caused by the technology of the injection molding process, without cracks or other damage occurring in the heating means 28. Since the individual function layers 30, 40, 50, 61 of the lamina composite most firmly adhere to each other by reason of the very similar structures specific to their particular materials, the heating means 28 features long-lasting resistance to even extreme mechanical and/or thermal loads.

A suitable coating method for applying the individual function layers 30, 40, 50, 61 is film screen and thick-layer screen printing, i.e. use is preferably made of films or thick-layer pastes to be fired. This procedure becomes especially economical when firing the dielectric layer 40 is accompanied by inductive hardening of the nozzle body 12. It is important then to ensure that the respective firing conditions (such as temperature, residence time, cooling rate) are matched to the hardening and annealing temperatures predetermined by the steel type used. In particular, the firing temperatures of subsequent layers must not exceed the annealing temperatures of the metal in order to maintain its preformed state of microstructure. Such adaptation can be achieved, for example, by suitably varying the process parameters for the firing operation. It is likewise possible to adapt the thick-layer pastes to be used to particular materials.

Alternatively, the layers 30, 40, 50, 61 of the heating means 28 can be applied by blast coating or plasma coating to the bearing faces 14, 15 of the pre-annealed nozzle body 12.

The heating means 28 is reliably protected against moisture absorption by the direct layer application. Conventional heating devices comprising tubular radiators or coil blocks are prone to moisture absorption in hygroscopic insulation materials, which leads not only to installation problems but also to insulation trouble since the moisture absorbed may cause short circuits. In order to avoid this, regulators are required which provide start-up of the heating unit such that reduced power input will expel the moisture first. The heating means of the invention does not require this step. On the contrary, it is completely water-tight and is irremovably bonded to the flow duct so that hitherto indispensable installation and regulating expenditures are no longer incurred. This is advantageous for the purchase and installation costs of a hot runner system.

Figure 4:
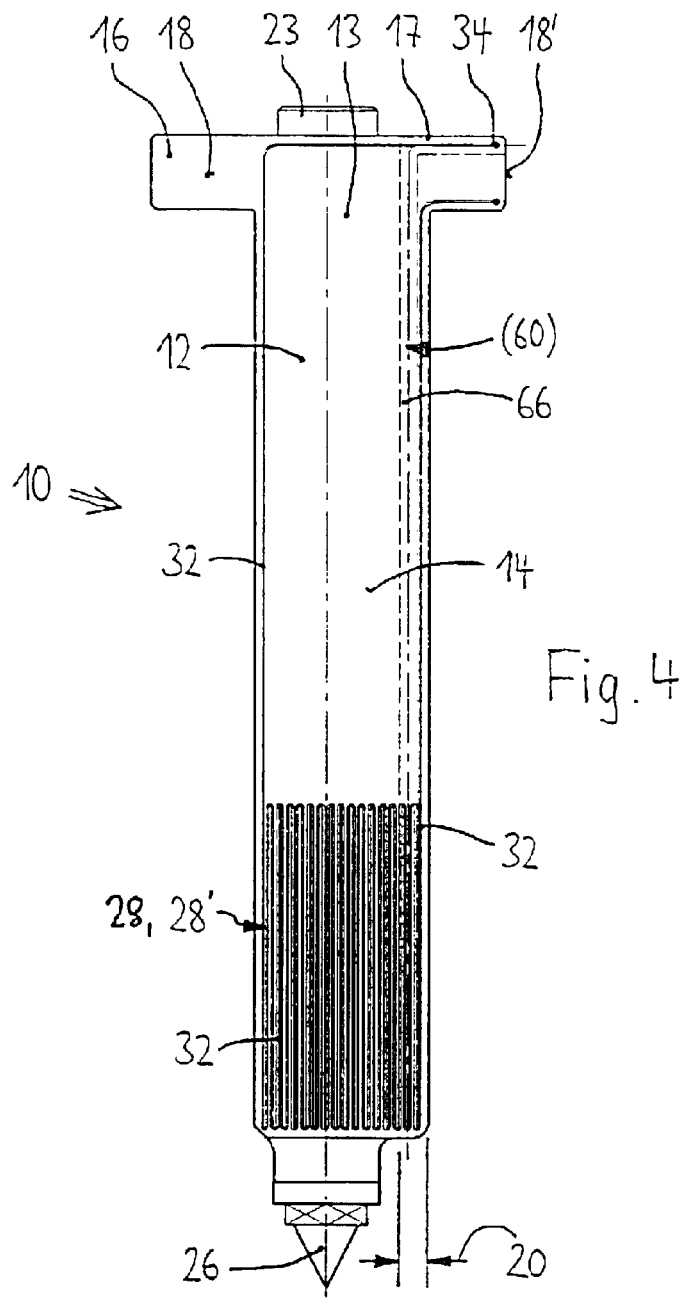
FIG. 4 is a side view of a hot runner nozzle with replaceable temperature sensor.
Figure 5:
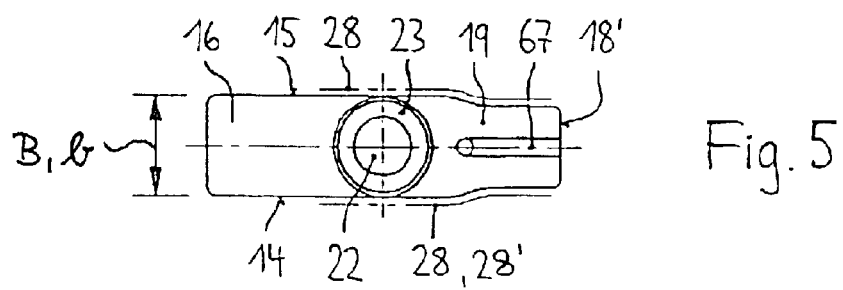
FIG. 5 is a top view of the hot runner nozzle of FIG. 4.

Another alternative of the invention involves the use of a thermosensor 60 which is not a layer but a replaceable plug-in unit inserted in a slot 66 formed in nozzle body 12. As shown in FIG. 4, this slot 66 extends parallel to flow duct 22 in a laterally broadened region 20 of nozzle body 12. In order to have easy lateral access to the connecting terminals 64 of the thermosensor 60, the top side 19 of lug 17 has a notch 67 which winds up in an end face 18' of lug 17 for receiving an offset end (not shown) of thermosensor 60, inclusive of terminals (FIG. 5).

The nozzle assembly shown in FIG. 6 comprises a total of four hot runner nozzles 10 which are disposed in a row R as a densely packed parallel arrangement. Each of two hot runner nozzles 10 has a cross-sectionally rectangular nozzle body 12 and these are interconnected at their upper ends 13 via a bridge 21, preferably so as to be integral therewith. The nozzle assembly thus forms a comb-like flat body K whose overall thickness D is substantially governed by the width B of the nozzle bodies 12. The latter carry two retainer arms by way of opposite lugs 16, 17 for attachment of the assembly to a hot runner mold or manifold (not illustrated). Their width b corresponds to the width B of the flat body K (cf. FIG. 2).

It will be seen that the hot runner nozzles 10 and their bodies 12, respectively, are very close together within the flat body K so that the spacing between the mold cavities can be relatively small, e.g. 8 mm or less, which is of great advantage primarily with the so-called outsert technology. Due to their being interconnected only in the upper end regions 13, the nozzle bodies 12 can expand as necessary to compensate for different thermal conductivities between the cold mold and the hot manifold. Internal stresses within the flat body K are thus effectively avoided.

Two opposite plane lateral surfaces S of nozzle body 12, which is preferably made of steel, serve as bearing faces for lamina heating means 28 each, and the heating conductors 32 of each pair of adjacent heating means 28 in one plane are interconnected via the bridges 21 and are associated to common terminal contacts 34, 34'. The latter are situated laterally on receding end regions of the lugs 16, 17 formed on the respective outer hot runner nozzles 10. In this manner, the pairs of heating means 28 shown in FIG. 6 can be assigned to separate heating circuits, and the heatings means 28 in the interior can be readily supplied with current from an external source. Each of the outer hot runner nozzles 10 is provided with a thermosensor 60 whose terminal contacts 64 are likewise fixed on the lateral surfaces 18 of lugs 16, 17.

Depending on the power requirement, the heating means 28 on a lateral surface S of the flat body K can also be combined in a single heating conductor 32 which starts and ends at terminal contacts 34 on only one lug 17. Power is supplied, for example, through a single heating circuit connected laterally via lug 17. As the heating means 28 situated opposite each other on the sides S provide a uniform temperature distribution within the flow duct 22, the total heater capacity may be reduced compared with a one-sided solution.

In the embodiment of FIGS. 6 and 7, four hot runner nozzles 10 are arranged in parallel side-by-side. However, an arbitrary plurality of nozzles 10 may be arrayed next to each other in a row R, and with a larger number of nozzles 10 it may be advantageous—depending on the power required—to provide heater connectors 34, 64 on either side of the nozzle row R.

Another embodiment of a hot runner nozzle 10 is illustrated in FIG. 8. The opposing lateral surfaces 14, 15 of the nozzle body 12 are each provided with a flat recess 36 whose depth is, for example, 0.4 mm. Each recess 36 is lined with a ceramics layer 40 having electrical insulating properties suitable for either low voltages or mains voltage. In this lined pocket or recess 36 a heating conductor 32 of a thin film F is placed which includes a plurality of meandering loops near the nozzle tip 26. The film F is composed of a resistor material and is narrower in the region of the meandering loops than in the remaining regions of the nozzle body 12. In this way, power is deliberately concentrated in the region of the nozzle tip 26. In order to fix the heating conductors 32 in the recesses 36, ceramic pins 37 are provided which positively and/or frictionally engage in corresponding holes 38 of the film F. As shown in FIG. 9, the ends of the heating conductors 32 extend into the lateral faces 18 of the opposing retainers or lugs 16, 17, and the recesses 38 likewise extending to that point are open towards the end faces 18' of lugs 16, 17. This makes the heating conductors 32 provided on both sides accessible to terminal contacts (not shown) of a plug (likewise not visible).

For external insulation of the overall flat heating assembly, the heating conductors 32 may be provided with a cover layer 50 or be terminated by cover plates 70 (FIGS. 9 and 10). The latter are preferably of metal and carry on at least one side an insulating layer 72 facing the respective heating means 28. Moreover, they are T-shaped so that all of the lateral lugs 16, 17 and their terminal contacts 34 are externally protected. Attachment of the plates 70 is expediently effected by means of screwed or welded bolts (not shown). Thus additional surface pressure is attained so as to warrant reliable thermal contact between the film F and the nozzle body 12 or K, respectively.

In the embodiment shown in FIGS. 11 and 12, a plurality of closely packed parallel hot runner nozzles 10 is situated in a row R, the bridges 21 between the nozzle bodies 12 being extremely thin. The distances between the nozzle tips 26 are reduced to a minimum right up to the region below the bridges 21, with remaining narrow slits 21' allowing for extremely small cavity spacings. Each lateral surface S of the flat body K, which is a single unit, has a recess 38 that extends beyond the bridges 21 and that accommodates a continuous heating conductor 32 of a resistance film F. The film F or conductor 32 commences at the lateral surface 18 of one of said lugs 16 and ends at the lateral surface 18 of the other lug 17, both lugs 16, 17 receding in their end regions in order to receive a plug. The cover plates 70 provided on either side are likewise slotted in the region below the bridges 21 so that the upper compact region of the nozzle row R can expand to a greater extent than the lower parts of the nozzle body 12, which in the region of the nozzle tips 26 form a seal in the cold mold.

Yet another embodiment of the invention is shown in FIGS. 13 to 15. Heating of the nozzle body 12 is effected via a tubular heater 28 accommodated in a notch 29, which heating means commences in the first lug 16 along the left edge of the lateral face 14 into the region of the nozzle tip 26, where it forms at least two symmetrical loops before extending up the right edge of the lateral face 14 and from there to the second lug 17. In the region where the heating means changes sides, the flow duct 22 recedes to create a step 22' in order that the nozzle body 12 would at this point withstand the pressure prevailing in flow duct 22. Another important function of the step 22' is to form a stop for screwing-in the nozzle tip 26 whereby it is ensured that the total length of the nozzle 10 will always remain the same after replacement of the nozzle tip 26. Readjustment of the mold is not necessary. The heating means can be positively and/or frictionally forced into the notch 29 or be held therein by soldering.

It will be seen from FIGS. 14 and 15 that the tubular heating means 28 provided on either side 14, 15 of the nozzle body 12 terminate flush therewith and are externally shielded by a cover plate 70 having the same shape as nozzle body 12. For connecting the heating means 28 to one or more heating circuits, terminals 34 protrude from the end faces 18' of lugs 16, 17.

FIGS. 16 to 18 show a row of nozzles R comprising three hot runner nozzles 10. The nozzle bodies 12 are combined to form a comb-like flat body K containing a single heating means 28 on either side. Their tubular heater 28 is situated in a notch 29 which extends across the bridge 21 over all three nozzle bodies. Electrical connection of the heating means 28 is effected through the lugs 16, 17 formed on the outer hot runner nozzles in the manner disclosed above.

Instead of accommodating tubular heaters 28, the notches 29 may readily contain a cooling coil 42 through which a cooling agent can flow in order to cool the nozzle body 12 or the flat body K. A cooling device 28' of this type keeps a flow melt in the ducts 22 at a constantly low temperature whereby the system can be used as a cold runner system. It is also conceivable to form cooling coils 42 directly in the nozzle bodies 12, for example by means of bores. Alternatively, the notches 29 may be sealingly covered by plates 70 so that a cooling agent can directly flow in the notches 29.

Figure 19:
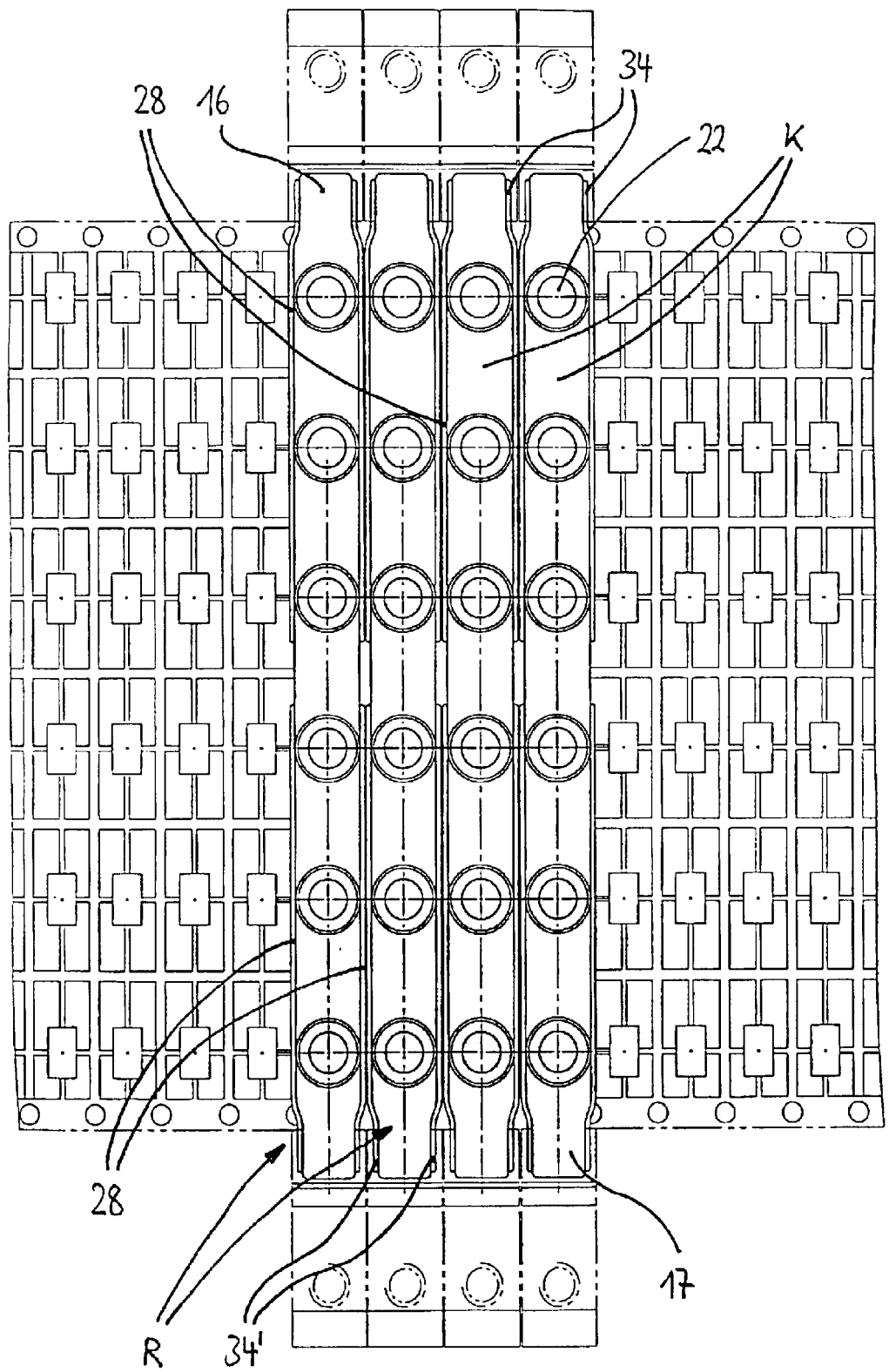
FIG. 19 is a top view of a battery of hot runner nozzles.

A significant development of the invention is shown in FIG. 19 which shows four or more nozzle rows R disposed parallel and in tightly engaged packing side-by-side. By reason of the flat heating means 28 on the respective lateral surfaces S of the nozzle rows R, the distances between the nozzle tips 26 are relatively small also transversely to the longitudinal direction of the rows R so that in such a battery of nozzles, extremely small gating point spacings of a few millimeters only can be realized in both the X and Y directions. Indeed, very large groups of gating points can thus be supplied with plastics material. Since the directly adjacent heating surfaces between the nozzle rows R mutually influence each other, the total heating capacity may be further reduced, which is advantageous as to power consumption.

The mounting effort for a battery of nozzles according to the invention is extremely simple and reduced to a minimum. Each nozzle row R is rapidly and conveniently attached to a manifold or mold via the external lugs 16, 17 so that the usually time-consuming fixing of numerous individual nozzles is no longer necessary. Depending on the desired number of nozzles 10, several rows R are simply placed next to each other. The grouped heating means 28 can then be connected via lugs 16, 17 to heating circuits to which they are associated. Unlike the prior art, the inner heating means 28 of the hot runner nozzles 10 are automatically supplied with energy from outside without elaborate input and output cables or connecting leads. The cost of installation is reduced to a minimum.

Depending on the embodiment of the heating means 28, cover plates 70 may be provided between the various nozzle rows R, one cover plate then to be insulated on both sides being sufficient for any two adjacent heating means 28. Alternatively, only one heating unit 28 may be provided between any two rows of nozzles R at the lateral surfaces S of flat body K or at the lateral faces 14, 15 of nozzle body 12. The flow ducts 22 situated on either side of a heating means 28 will then receive heat from a central source. In order to connect the nozzle rows R to the cover plates and to brace the rows R or their heating means 28 against each other, use is made of threaded bolts (not shown) which pass in-line through the flat bodies K at several points, or the battery of nozzles is gripped from outside by one or more clamps (not illustrated, either).

Even smaller distances between the nozzle tips 26 are achieved if the nozzle rows R are staggered in a longitudinal direction and each hot runner nozzle 10 laterally engages a depression formed in the region of the bridges 21.

Figure 20:
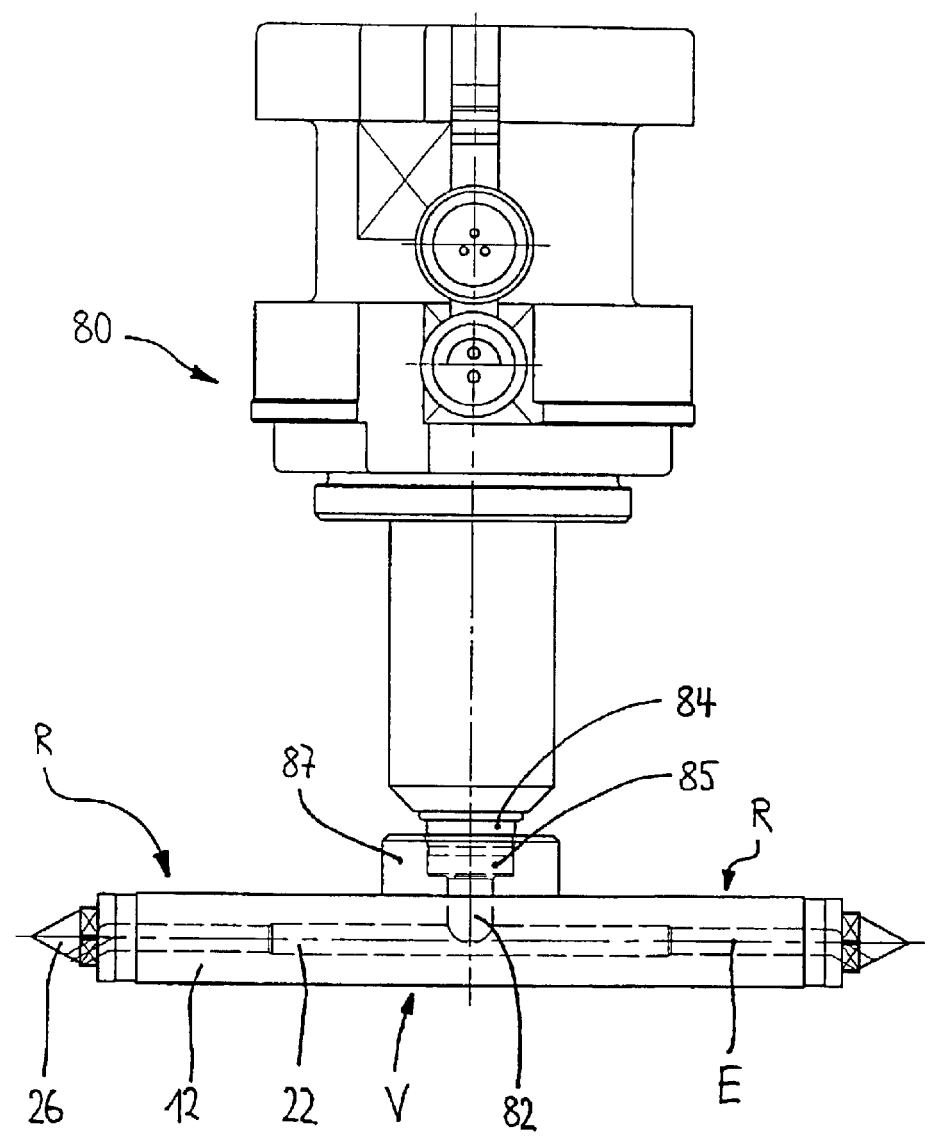
FIG. 20 is another embodiment of a hot runner nozzle assembly.
Figure 21:
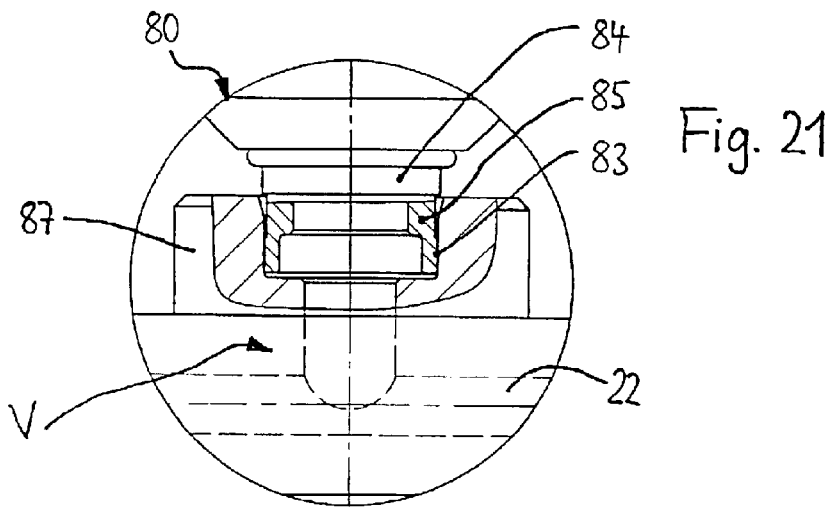
FIG. 21 is an enlarged portion of FIG. 20, partially in cross section.
Figure 22:
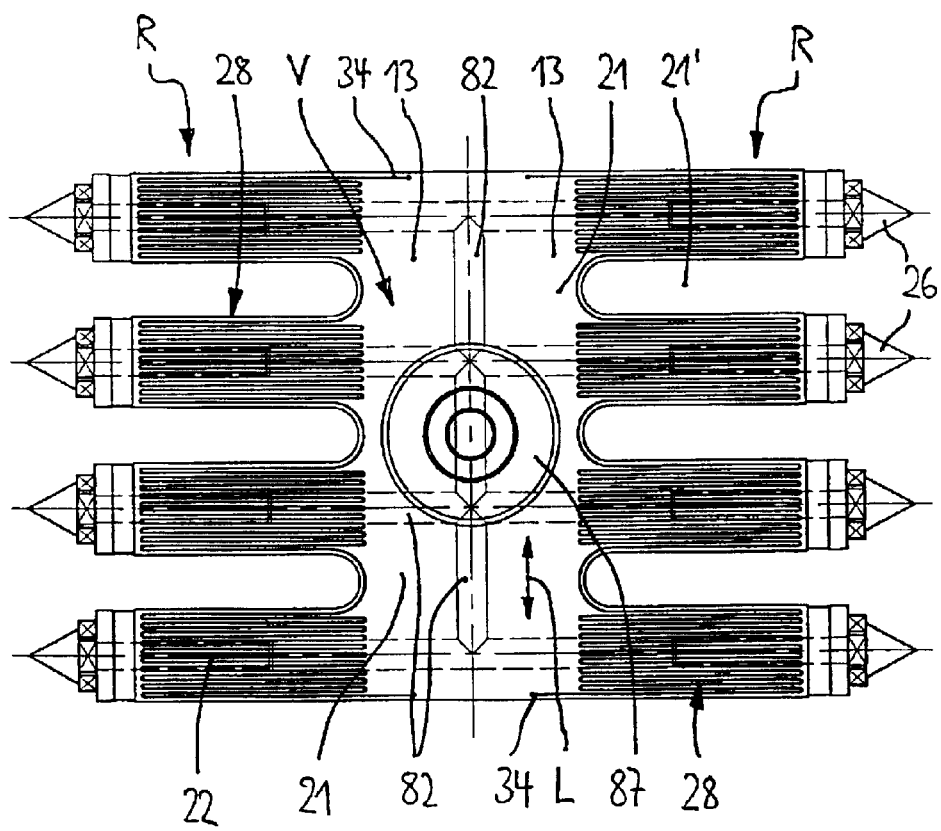
FIG. 22 is a top view of the hot runner nozzle assembly of FIG. 20.

The hot runner nozzle assembly illustrated in FIGS. 20 to 22 makes it possible, in an advantageous manner, to carry out horizontal injection molding into a plurality of closely spaced adjacent mold cavities. Two nozzle rows R lie in a common horizontal plane E and are interconnected in the region of their rear ends 13, preferably as a single unit. The nozzle bodies 12 and the bridges 21 formed therebetween in a longitudinal direction L form a manifold block V that contains distributing runners 82 which are in direct flow connection with the flow ducts 22 of the nozzle bodies 12.

A separate hot runner or cold runner nozzle 80 is mounted on the manifold V as central feeder which includes a tube 84 surrounded by a cylindrical heater (not shown), the free end 85 of said tube being in lateral sealed engagement in a centric inlet orifice 83 of the manifold V. This will guarantee that when the system is heated up or cooled down, axial expansion compensation is possible under good seal. It will be realized from FIG. 21 that the inlet orifice 83 is formed in a bush shoulder 87 mounted on the manifold V, whereby the expansion clearance is favorably assisted.

Figure 23:
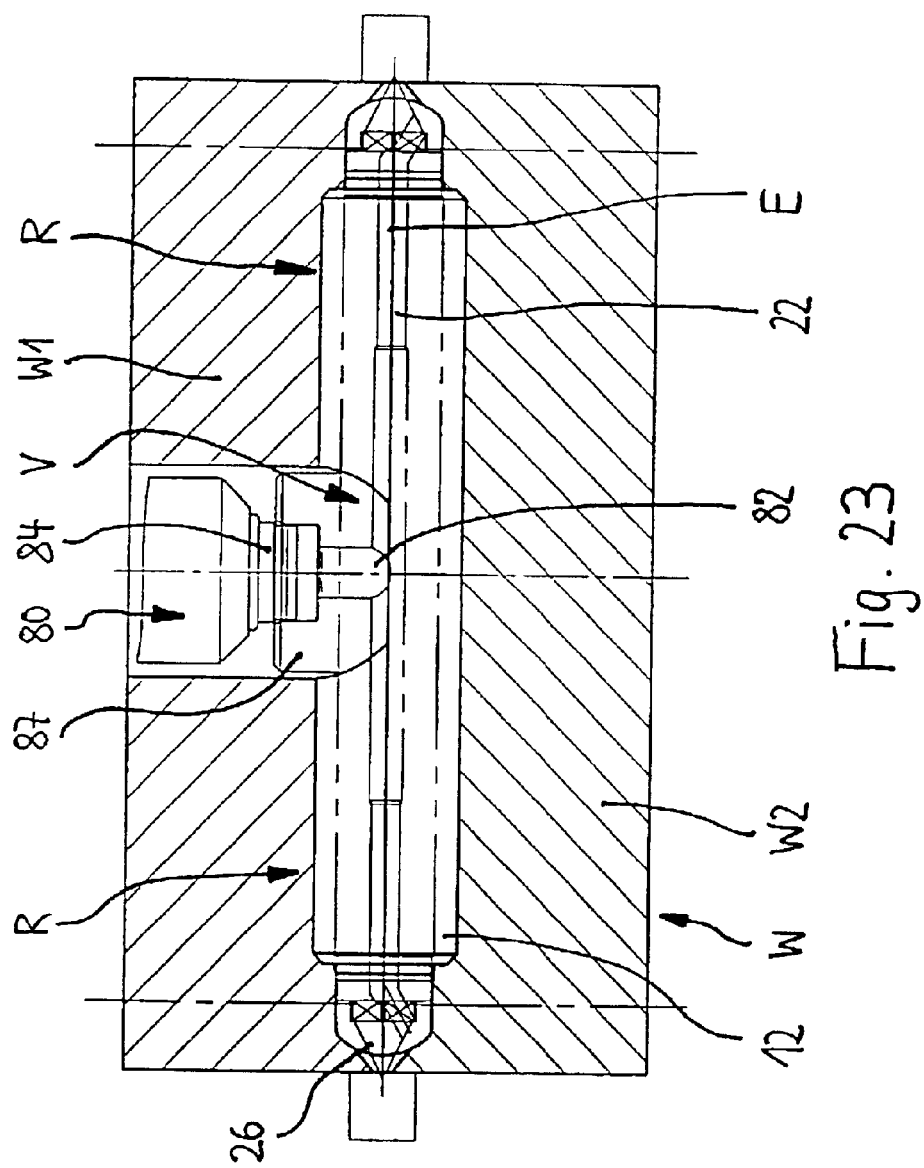
FIG. 23 is a cross-sectional view of a nozzle assembly mounted on a mold and FIG. 24 is a top view of the hot runner assembly of FIG. 23, partially in cross section.
Figure 24:
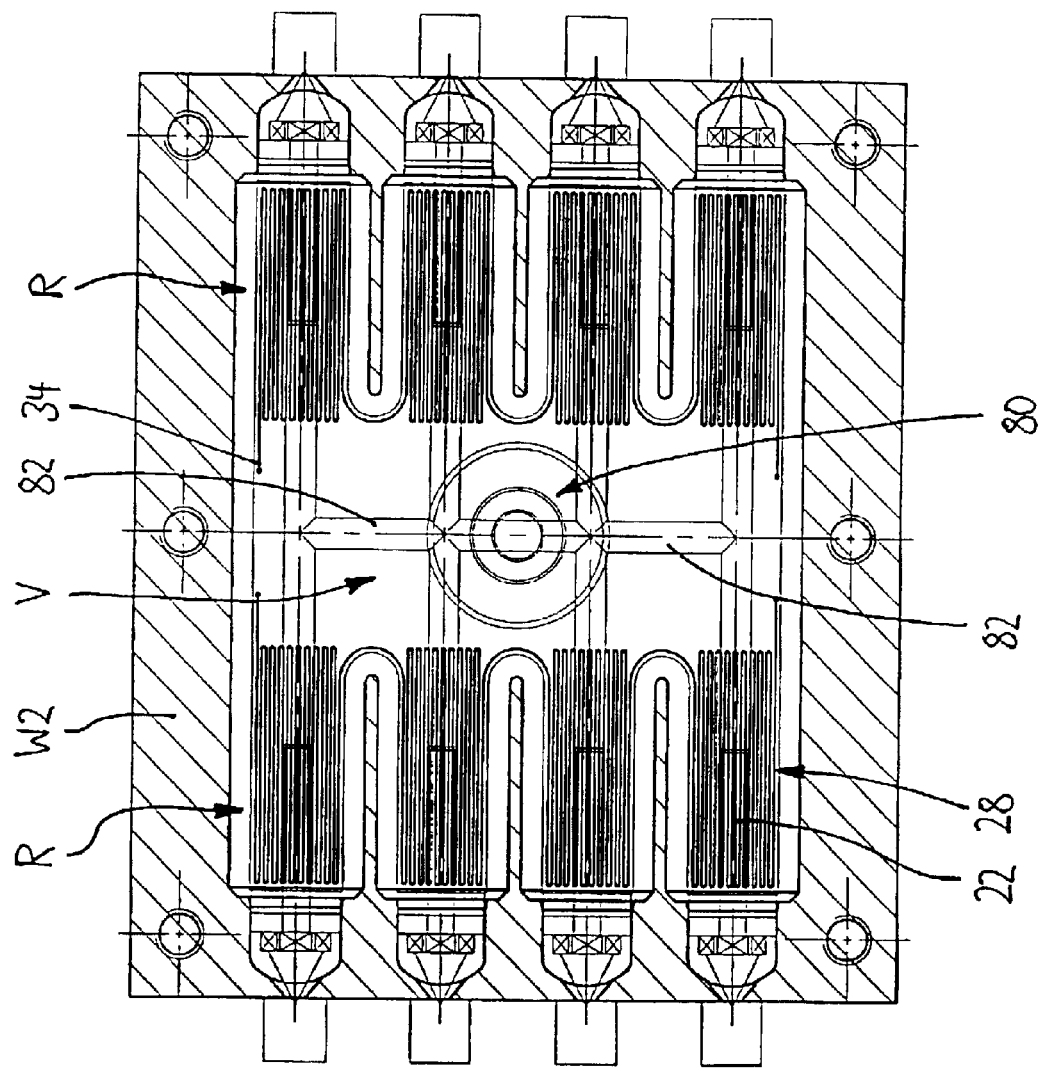

FIGS. 23 and 24 show the situation upon installation of the hot runner nozzle block of FIG. 20 in a mold W that is divided into two halves W1 and W2 exactly symmetrical to the plane E of the nozzle rows R. As the nozzles 10 are arranged in horizontal rows, the mold W may if desired also be divided vertically, i.e. symmetrically to the central nozzle 80.

The invention is not restricted to any of the embodiments described above but can be modified in variegated ways. For example, the lateral surfaces 14, 15, S of the nozzle body 12 or the nozzle rows R may portionwise be slightly curved, which can be particularly advantageous where adjacent rows of nozzles R are staggered in a longitudinal direction and the individual nozzle bodies 12 engage depressions in the lateral surfaces S.

It will be seen that a nozzle 10 for an injection mold has a nozzle body 12 which can be mounted on a mold or manifold wherein at least one duct 22 for a melt flow is provided one end of which opens at, or in, a nozzle tip 26. In order to be able to realize extremely small cavity spacings in two independent spatial directions, the nozzle body 12 has at least one substantially plane lateral face 14, 15 which carries or accommodates a heating and/or cooling means 28, 28' for the melt flow, said means being facewise attached to, or placed against, said lateral face of the nozzle body 12. In a special embodiment, the nozzles 10 within a nozzle row R are closely packed parallel to each other, and two opposing lateral surfaces S of the nozzle row R are provided with heating and/or cooling means 28, 28' suited to be connected in groups to a heating or cooling circuit via a common external connector 34.

All and any features and advantages, including structural details, spatial arrangements and process steps as evident from the claims, description and drawings, may be essential to the invention either alone or in whatever combination.

| List of Reference Symbols | |
|---|---|
| b | width (lug) |
| B | width (nozzle body) |
| D | total thickness (nozzle row) |
| E | plane |
| F | film |
| K | flat body |
| L | longitudinal direction |
| R | row of nozzle |
| S | lateral surface |
| V | manifold (block) |
| W | mold |
| W1 | mold half |
| W2 | mold half |
| 10 | hot/cold runner nozzle |
| 12 | nozzle body |
| 13 | top end |
| 14, 15 | lateral face (nozzle body) |
| 16, 17 | lugs |
| 18 | lateral face (lug) |
| 18' | end face (lug) |
| 19 | top face (lug) |
| 20 | broadening |
| 21 | bridge |
| 21' | slot |
| 22 | flow duct |
| 22' | step |
| 23 | centering shoulder |
| 24 | tube |
| 26 | nozzle tip |
| 28 | heating means |
| 28' | cooling means |
| 29 | groove |
| 30 | heating layer |
| 32 | heating conductor(s) |
| 34, 34' | terminal contact |
| 36 | recess / pocket |

-continued

List of Reference Symbols

| | |
|---|---|
| 37 | pin |
| 38 | 38 hole (film) |
| 40 | insulating layer |
| 42 | cooling coil |
| 50 | cover layer |
| 60 | thermosensor |
| 61 | monitoring layer |
| 62 | conductor(s) |
| 64 | terminal contact |
| 66 | slot |
| 67 | groove |
| 70 | cover |
| 72 | insulating layer |
| 80 | feed unit |
| 82 | distributing layer |
| 83 | inlet oriface |
| 84 | tube |
| 85 | free end |
| 87 | bush shoulder |

What is claimed is:

1. A nozzle (10) for an injection mold comprising a nozzle body (12) including a mounting structure on an end thereof having a longitudinal axis that is adapted to be mounted on a mold or manifold, the nozzle body including at least one duct (22) for a melt flow which duct opens endwise at or in a nozzle tip (26), and comprising a heating and/or cooling means (28, 28') for the melt flow, the nozzle body (12) having at least one substantially plane lateral face (14, 15) which is generally parallel to the longitudinal axis of the mounting structure and supports or accommodates said heating and/or cooling means (28, 28') in a full-faced engaging and/or joining arrangement, the at least one substantially plane lateral face (14, 15) being provided with the at least one heating and/or cooling means.

2. A nozzle (10) for an injection mold comprising a nozzle body (12) adapted to be mounted on a mold or manifold, the nozzle body including at least one duct (22) for a melt flow which duct opens endwise at or in a nozzle tip (26), and comprising a heating and/or cooling means (28, 28') for the melt flow, the nozzle body (12) having two opposing substantially plane lateral faces (14, 15) each of which supporting or accommodating the heating and/or cooling means (28, 28') in a full-faced engaging and/or joining arrangement, each of the substantially plane lateral faces (14, 15) being provided with the heating and/or cooling means (28, 28').

3. Nozzle according to claim 1, wherein the nozzle (10) is a hot runner nozzle and to each hot runner nozzle (10) a healing means (28) is associated comprising heating conductors (32), the power distribution on each lateral surface (14, 15) being adapted to power requirements.

4. Nozzle according to claim 1, wherein the nozzle (10) is a cold runner nozzle and to each cold runner nozzle (10), a cooling means (28') is associated having cooling coils (42) for transporting a cooling or refrigerating agent, the power distribution on each lateral surface (14, 15) being adapted to power requirements.

5. Nozzle according to claim 3, wherein the heating or cooling power is concentrated near the region of the nozzle tips (26).

6. Nozzle according to claim 3, wherein the heating conductors (32) or the cooling coils (42) are at least partially bifilar.

7. Nozzle according to claim 1, wherein the heating and/or cooling means (28, 28') provided on the lateral faces (14, 15) are associated to at least one heating or cooling circuit.

8. Nozzle according to claim 1, wherein a thermosensor (60) is associated to at least one heating and/or cooling means (28, 28').

9. Nozzle according to claim 8, wherein the thermosensor (60) is a component of the nozzle body (12) and at least one lateral face (14, 15) accommodates or supports the thermosensor (60) in a full-faced engaging or joining arrangement.

10. Nozzle according to claim 8, wherein the thermosensor (60) is inserted in a slot (66) formed in the nozzle body (12), which slot runs parallel to the flow duct (22) in the region of a broadened portion (20) of the nozzle body (12).

11. Nozzle according to claim 1, wherein the nozzle body (12) has at its upper end (13) at least one lateral lug (16, 17) whose width (b) does not exceed the width (B) of the nozzle body (12), terminals (34, 64) for the heating means (28), the cooling means (28') and/or the thermosensor (60) being provided on, at or in one of said tugs (16, 17).

12. Nozzle according to claim 11, wherein the terminals (34, 64) are formed on the lateral faces (18) of the tugs (16, 17).

13. Nozzle according to claim 11, wherein at least one of the tugs (16, 17) is of less width than the nozzle body (12).

14. Nozzle according to claim 1, wherein the heating device (28) includes a lamina composite having at least two layers (30, 40), the heating conducts (32) consisting of a heating layer (30) applied to an insulating layer (40).

15. Nozzle according to claim 14, wherein the insulating layer (40) is a ceramic dielectric layer irremovably attached to the lateral face (14, 15) and is, after at least one firing process, under compressive pretension relatively to said lateral face, the linear coefficient of thermal expansion ($TEC_{DE}$) of the dielectric layer (40) being smaller than the linear coefficient of thermal expansion ($TEC_K$) of the material of the lateral face (14, 15).

16. Nozzle according to claim 14, wherein at least one electrically insulating cover layer (50) is applied to the heating layer (30).

17. Nozzle according to claim 14, wherein the thermosensor (60) is in the form of a layer and wherein the heating layer (30) and the monitoring layer (60) are disposed one over the other or in the same plane.

18. Nozzle according to claim 14, wherein the heating layer (30), the insulating layer (40), the cover layer (50), the contact layer and the monitoring layer (60) form a lamina composite, and the overall thickness of the lamina heating means (28) is between 0.1 mm and 1.0 mm, preferably between 0.2 mm and 0.6 mm.

19. Nozzle according to claim 14, wherein the heating layer (30), the insulating layer (40), the cover layer (50), the contact layer and/or the monitoring layer (60) are baked films or baked thick-layer pastes, or they are applied to the lateral faces (14, 15) by means of blast coating or plasma coating.

20. Nozzle according to claim 14, wherein the heating layer (30) is a metal foil attached to the insulating layer (40).

21. Nozzle according to claim 1, wherein the heating means (28) is a resistance wire or a tubular heating unit.

22. Nozzle according to claim 1, wherein each heating and/or cooling means (28, 28') is embedded in a notch (29) or recess (36) in the respective lateral face (14, 16).

23. Nozzle according to claim 1, wherein each heating and/or cooling means (28, 28') is flush with the nozzle body (12).

24. Nozzle according to claim 1, wherein each heating and/or cooling means (28, 28') is provided with a cover (70).

25. A nozzle assembly for injection molds comprising at least two nozzles (10), each having a nozzle body (12)

adapted to be mounted on a mold or manifold, each nozzle body including at least one melt flow duct (22) which opens endwise at or in a nozzle tip (26), and comprising a heating and/or cooling means (28, 28') for the melt flow, wherein the nozzles (10) form a nozzle row (R) in the form of a flat body (K) within which they are disposed in close packing parallel to each other, the flat body (K) having at least one substantially plane lateral surface (S) supporting or accommodating the heating and/or cooling means (28, 28') in a full-faced engaging and/or joining arrangement, the substantially plane lateral face (14, 15) being provided with the heating and/or cooling means (28, 28'), the total thickness (D) of the flat body (K) being substantially determined by the thickness (width B) of the nozzle bodies (12).

26. Nozzle assembly according to claim 25, wherein at least one lateral lug (16, 17) of the nozzle body (12) is formed on an outer nozzle (10) of the row (R).

27. Nozzle assembly according to claim 25, wherein the heating means (28) or the cooling means (28') of adjacent nozzles (10) are interconnected and associated to a common terminal (34).

28. Nozzle assembly according to claim 25, wherein the heating means (28) or the cooling means (28') of adjacent nozzles (10) are groupwise associated to separate heating or cooling circuits that have a common terminal (34).

29. Nozzle assembly according to claim 25, wherein at least two nozzle rows (R) are disposed side-by-side by surface match in a mold or manifold.

30. Nozzle assembly according to claim 29, wherein the nozzle rows (R) are in staggered relationship to each other.

31. Nozzle assembly according to claim 25, wherein two rows of nozzles (R) are in a common plane (E) and are interconnected at their rear ends, for example in a single unit.

32. Nozzle assembly according to claim 31, wherein the nozzle rows (R) have a common central feed unit (80) comprising distributing runners (82).

33. Nozzle assembly according to claim 32, wherein the distributing runners (82) are balanced.

34. The nozzle of claim 1, further comprising two opposing substantially plane lateral faces (14, 15), each of the substantially place lateral faces (14, 15) being provided with the heating and/or cooling means (28, 28').

35. The nozzle of claim 1, wherein the at least one substantially plane lateral face is part of an exposed exterior surface of the nozzle body.

36. Nozzle according to claim 4, wherein the cooling power is concentrated near the region of the nozzle tips (26).

37. Nozzle according to claim 4, wherein the cooling coils (42) are at least partially bifilar.

* * * * *